(12) United States Patent
Keister

(10) Patent No.: US 9,227,864 B2
(45) Date of Patent: Jan. 5, 2016

(54) METHOD AND COMPOSITION FOR OPERATION OF EVAPORATIVE COOLING TOWERS AT INCREASED CYCLES OF CONCENTRATION

(71) Applicant: ProChemTech International, Inc., Brockway, PA (US)

(72) Inventor: Timothy Edward Keister, Brockway, PA (US)

(73) Assignee: ProChemTech International, Inc., Brockway, PA (US)

( * ) Notice: Subject to any disclaimer, the term of this patent is extended or adjusted under 35 U.S.C. 154(b) by 384 days.

(21) Appl. No.: 13/852,624

(22) Filed: Mar. 28, 2013

(65) Prior Publication Data

US 2013/0334141 A1    Dec. 19, 2013

Related U.S. Application Data

(62) Division of application No. 13/098,084, filed on Apr. 29, 2011, now Pat. No. 8,496,847.

(51) Int. Cl.

| | |
|---|---|
| C02F 5/02 | (2006.01) |
| C02F 5/08 | (2006.01) |
| C02F 5/10 | (2006.01) |
| C02F 1/68 | (2006.01) |
| C02F 1/76 | (2006.01) |
| C02F 5/14 | (2006.01) |
| C02F 1/00 | (2006.01) |
| C02F 103/02 | (2006.01) |
| C02F 1/72 | (2006.01) |

(52) U.S. Cl.
CPC ... C02F 5/14 (2013.01); C02F 1/72 (2013.01); C02F 2103/023 (2013.01); C02F 2209/04 (2013.01); C02F 2209/055 (2013.01); C02F 2209/07 (2013.01)

(58) Field of Classification Search
None
See application file for complete search history.

(56) References Cited

U.S. PATENT DOCUMENTS

| | | | |
|---|---|---|---|
| 4,532,045 A | 7/1985 | Littmann | |
| 4,931,187 A | 6/1990 | Derham et al. | |
| 5,518,630 A * | 5/1996 | Freese et al. | 210/698 |
| 5,730,879 A | 3/1998 | Wilding et al. | |
| 6,063,289 A | 5/2000 | Failon et al. | |
| 6,063,290 A | 5/2000 | Failon et al. | |
| 6,641,754 B2 | 11/2003 | Buentello et al. | |
| 6,645,384 B1 | 11/2003 | Richardson et al. | |
| 7,087,189 B2 | 8/2006 | Austin et al. | |
| 7,122,148 B2 | 10/2006 | Duke et al. | |
| 7,157,008 B2 | 1/2007 | Owens | |
| 7,252,770 B2 | 8/2007 | Austin et al. | |
| 2009/0211983 A1* | 8/2009 | Keister et al. | 210/668 |
| 2011/0017945 A1* | 1/2011 | Miralles et al. | 252/180 |

* cited by examiner

Primary Examiner — Nam Nguyen
Assistant Examiner — Clare Perrin
(74) Attorney, Agent, or Firm — Kilyk & Bowersox, P.L.L.C.

(57) ABSTRACT

A method and chemical composition are provided which permit operation of evaporative cooling towers at increased cycles of concentration without formation of calcium scale. The method can include first determining the calcium hardness and total alkalinity of the makeup water, calculating the operating cycles of concentration using a formula developed for the specified chemical composition, then dosing the treated water to maintain a constant level of the chemical composition. The method permits scale-free operation of evaporative cooling towers at a minimum of two (2) cycles of concentration over existing technology.

6 Claims, No Drawings

METHOD AND COMPOSITION FOR OPERATION OF EVAPORATIVE COOLING TOWERS AT INCREASED CYCLES OF CONCENTRATION

CROSS REFERENCE TO RELATED APPLICATION

This application is a divisional of U.S. patent application Ser. No. 13/098,084, filed Apr. 29, 2011, which is incorporated herein in its entirety by reference.

BACKGROUND

Evaporative cooling towers are a cost effective means to provide cooling for commercial air conditioning and industrial processes. From 75% to 80% of the incoming heat load to an evaporative cooling tower is removed by evaporation of cooling water. As the cooling water evaporates, removing heat from the system, the dissolved solids present in the system water become more concentrated. At some point, the dissolved materials exceed the solubility limit(s), commonly called the saturation point, which results in precipitation and formation of undesirable scale, often a calcium carbonate scale.

Makeup water is water added to replace evaporated water and maintain cooling water level in a cooling tower. Blowdown is water intentionally drained from the cooling tower to restrict the buildup of dissolved solids to levels below their saturation point. Cycles of concentration (COC) is a term used to denote the concentration of dissolved solids in the system water as compared to the makeup water. For instance, two COC indicates that the dissolved solids in the system water are twice (two times) the level in the makeup water.

Blowdown constitutes a major environmental impact from cooling tower system operation as it is "wasted" water, water run to sewers that must be replaced with fresh water. For instance, a 1000 ton rated cooling tower running at two COC will evaporate 25,000 gallons per day (gpd) with a blowdown of 25,000 gpd. If the COC are increased to four, the blowdown would be reduced to 12,000 gpd. Basically, evaporation equals 26.55 gpd/ton cooling (one ton cooling is defined as 12,000 btu/hr) while blowdown is calculated as evaporation/COC−1.

Cooling towers are routinely operated at two to six COC and are generally treated with a variety of scale, corrosion, and biological control (biocide) control chemicals. As a result, cooling tower blowdown has high dissolved solids content and often contains substantial amounts of toxic materials, primarily biocides. The high dissolved solids and biocide content of cooling tower blowdown create an adverse environmental impact when discharged to the public sewers or surface waters. In addition, environmental restrictions on discharge of some active corrosion inhibitors, such as phosphate, zinc, and molybdate, have placed restrictive limits on the amount of cooling tower blowdown that can be discharged.

Operation at higher COC generally results in saturation limits being exceeded. As a result, acid or scale inhibitors must be added to the water to prevent scale formation. In practice, acid is not recommended due to health, safety and control issues. The use of scale inhibiting products generally limits the system to a maximum of 150 to 200 times saturation, such as taught in U.S. Pat. No. 6,645,384, herein incorporated by reference in its entirety. In most cases, the COC obtained by use of a scale inhibitor is far less than desired especially in cases of hard, alkaline makeup waters where the COC can often be as low as 2, requiring a large blowdown discharge to maintain the system scale and deposit free.

Due to drought conditions, water pollution, and continuing increased usage of fresh water supplies, many areas of the country are experiencing water shortages. In these situations where fresh water is in short supply, it is desirable to limit cooling tower blowdown to conserve as much water as possible.

The United States Green Building Council (USGBC) (Washington, D.C.) has implemented a building certification plan for retrofitted and new buildings, Leadership in Energy and Environmental Design (LEED). The LEED certification program awards "points" for building features that improve energy usage and reduce building operation environmental impact. Reduction of cooling tower blowdown can provide LEED points due to reduced water use and lessened environmental impact. The USGBC LEED program is another driver towards reduction of cooling tower blowdown.

Many methods have been proposed for decreasing blowdown from cooling towers. In one approach described in U.S. Pat. No. 4,931,187, herein incorporated by reference in its entirety, the amount of scale causing calcium added to a cooling tower is carefully controlled, by operation of a complex system of cooling water analysis, makeup softening, and controlled hard water bypass, under computer control, to maintain the cooling water saturation below a level at which scale formation would occur. This approach is costly and has proven to be impractical in practice due to analytical and control difficulties.

Another approach, as described in U.S. Pat. No. 5,730,879, herein incorporated by reference in its entirety, is to equip the cooling tower with a bypass cation resin exchanger operated in the hydrogen (strong acid) mode with bypass of cooling water through the exchanger governed by the pH of the cooling water. The rate of bypass flow is governed by the desired pH, which is selected so as to maintain the cooling water below saturation thus preventing scale as the cycles are increased. Problems with this approach involve plugging of the resin exchanger with suspended solids typically found in cooling water and the need for constant replacement of the cation resin as its acid charge is used. An additional potential problem is that if control of the bypass flow through the acid cation resin is lost, either severe scale formation will occur or acid induced corrosion of the cooling tower structure can result. A modification is given in U.S. Pat. No. 4,532,045, herein incorporated by reference in its entirety, with the addition of a bypass filter to remove suspended solids and use of weak acid mode cation resin to reduce the possibility of severe corrosion from loss of pH control. This method still suffers from the constant replacement of the cation resin as its weak acid charge is used and from control difficulties.

In yet another bypass method, U.S. Pat. No. 7,157,008 B2, herein incorporated by reference in its entirety, describes the use of bypass chemical precipitation of hardness causing calcium from the cooling water, thus allowing higher cycles and potential elimination of blowdown. This process involves strict chemical addition of precipitating agents to the bypass cooling water flow, removal of the formed solids, and produces a liquid sludge, containing scale causing materials, for disposal. Equipment costs are quite high with this process and process control requirements are substantial.

Another method of increasing cycles to minimize blowdown is described in U.S. Pat. No. 7,122,148 B2, herein incorporated by reference in its entirety. This process involves softening the makeup water and increasing the cycles to a point where no blowdown would be needed. No additional products are used for corrosion control. Corrosion control is due to the buildup of silica in the water by cycling and silica precipitation is prevented by maintaining a high pH in the cooling water by either natural elevation due to cycling or by the addition of sodium hydroxide. This method does not work well in current practice as cycled softened water is extremely corrosive to most materials used to construct cooling towers, in particular steel, galvanized steel, zinc, and yellow metal alloys.

None of these methods are in current common use to increase COC to minimize blowdown from evaporative cooling towers. Existing chemical compositions and materials for control of scale and deposition in evaporative cooling towers waters are deficient because no particular method or composition is taught for utilizing operation of evaporative cooling towers at high COC (see, for example, U.S. Pat. Nos. 6,063,289, 6,063,290, 6,641,754 B2, 6,645,384 B1, 7,087,189 B2, and 7,252,770 B2.) Accordingly, there is a need for a method and composition to prevent scale and deposition within cooling towers while operating at increased COC which would reduce cooling tower blowdown.

SUMMARY

The present teachings are directed to compositions, methods, and systems for controlling scale and deposit formation within a cooling tower while operating at increased COC. The composition can comprise an aqueous solution of water, a 2-phosphonabutane-1,2,4-tricarboxylic acid (PBCT), a polyacrylic acid species (PAS), and polymaleic acid (PM). The water can comprise softened water. The PAS can comprise polylacrylic acid (PA), or polyacrylic acid styrene sulfonate (AASA), or a combination thereof. The pH of the composition can be adjusted. The composition can comprise an aqueous solution having a pH of about 3.0 to 13.8. The pH can be adjusted by any means, for example, the pH can be adjusted by addition of potassium hydroxide to the composition. The composition can further comprise one or more additives as described herein.

Compositions of the present teachings can be used to minimize, or eliminate, scale and deposition in cooling towers operated with hard alkaline makeup water at increased COC. The compositions can be used to reduce blowdown from evaporative cooling tower operation by operation at increased COC.

The present teachings also provide a method for calculation of the operating COC that prevents scale and deposition within a cooling tower. The method can reduce blowdown from the operation of evaporative cooling towers. The method can comprise: calculating the operating COC by operating $COC=2+\sqrt{110,000/(CaH+TA)}$, wherein CaH is the calcium hardness of the makeup water as $CaCO_3$ in mg/L, and TA is the total alkalinity to pH 4.5 of the makeup water as $CaCO_3$ in mg/L; adding to the cooling water a composition comprising an aqueous solution of a specified formulation of softened water, PBCT, PAS, and MA so that the concentration of PBCT in the treated cooling water is within the range of 6 to 14 mg/L; and optionally using a biocide to control biological growth. This method permits the COC of an operating cooling tower to be increased a minimum of 2 COC above existing technology for scale inhibition. The present teachings provide a method of preventing mineral scale and deposition within a cooling tower, the cooling tower containing cooling water contained therein, wherein the method comprises adding each of the core components of phosphonobutane tricarboxylic acid (PBCT), a polyacrylic acid species (PAS), polymaleic acid (PM), and softened water, individually, or in any combination of admixtures, so as to maintain a level of PBCT in the treated cooling water of from about 6 mg/L to about 14 mg/L.

In some embodiments the present teachings provide a system comprising a cooling tower containing a cooling water composition comprising an aqueous solution of the following core components: phosphonobutane tricarboxylic acid (PBCT); a polyacrylic acid species (PAS); polymaleic acid (PM); and softened water. The aqueous solution can have a pH of from about 2.0 to about 13.7. The PBCT, PAS, and PM can be present in a ratio of about 1:0.75:2.25.

Additional features and advantages of the present teachings will be set forth in the description which follows, and in part will be apparent from the description, or may be learned by practice of the present teachings. It is to be understood that both the foregoing summary and the following detailed description are exemplary and explanatory only and are intended to provide further explanation of the present teachings, as claimed.

DETAILED DESCRIPTION

According to various embodiments, a treatment composition is provided that can comprise an aqueous solution of softened water, 2-phosphonabutane-1,2,4-tricarboxylic acid (PBCT), polyacrylic acid species (PAS), and polymaleic acid (PM). The ratio of PBCT to PAS to PM can be, for example, from about 0.5:0.375:1.125 to about 2.0:1.5:4.5, for example, about 1:0.75:2.25. These four components constitute the "core components" of the composition. In some embodiments, the ratio of PBCT to PAS can be from about 1:0.5 to about 1:1, from about 1:0.6 to about 1:0.9, or from about 1.07 to about 1.08. In some embodiments, the ratio of PBCT to PM can be from about 1:1.5 to about 1:3, from about 1:2 to about 1:2.5, or from about 1:2.2 to about 1:2.3. In some embodiments, the ratio of PAS to PM can be from about 1:2 to about 1:4, from about 1:2.5 to about 1:3.5, or from about 1:2.75 to about 1:3.25. The composition can comprise an aqueous solution having a pH of from about 3.0 to about 13.8, and which can be adjusted by addition of potassium hydroxide, sodium hydroxide, or another alkaline hydroxide to the composition. The composition can further comprise at least one of sodium tolytriazole, sodium mercaptobenzothiazole, sodium benzotriazole, sodium lauroyl sarcosinate, triphenylmethane, copper phthalocyanide quad sulfonate, tetrasodium 1,3,6,8 pyrene tetrasulfonate, sodium molybdate dehydrate, and combinations thereof.

The composition can be adjusted to any desired pH level. For example the pH can be from about 2.5 to about 13.9, from about 3.0 to about 13.8, from about 3.5 to about 13.7, from about 5.0 to about 13.0, from about 7.0 to about 12.0, or from about 8.0 to about 10.0. The composition can have a pH of at least 3.0. In some embodiments thepH can be about 13.5 or higher.

According to various embodiments, the PBCT can be present in the composition in an amount of at least about 1.0% by weight based on the total weight of the core components of the composition, for example, in an amount of from about 1.5% by weight to about 10% by weight, in an amount of from about 2.0% by weight to about 5.0% by weight, or in an amount of from about 5.0% by weight to about 10.0% by weight, based on the total weight of the composition. The PBCT can comprise, for example, MAYOQUEST 2100, available from Compass Chemical International, LLC, of Smyrna, Ga.

According to various embodiments, the PAS can comprise PA, AASA, or any combination thereof. The PAS can be present in the composition in an amount of at least 1.0% by weight based on the total weight of the core components, that is, the total weight of the PBCT, PAS, PM, and softened water, combined. For example, the PAS can be present in an amount of from about 1.0% by weight to about 10% by weight, in an amount of from about 2.0% by weight to about 8.0% by weight, or in an amount of from about 3.5% by weight to about 6.0% by weight, based on the total weight of the core components. In some embodiments, the amount can instead be based on the total weight of the composition. The PA can comprise, for example, CARBOSPERSE K-752, available from Lubrizol of Brecksville, Ohio. The AASA can comprise, for example, CARBOSPERSE K-775, available from Lubrizol of Brecksville, Ohio.

According to various embodiments, PM can be present in the composition in an amount of at least 5.0% by weight based on the total weight of the core components, for example, in an amount of from about 5.0% by weight to about 25% by weight, in an amount of from about 10.0% by weight to about 15.0% by weight, or in an amount of from about 10.0% by weight to 20.0% by weight, based on the total weight of the core components. In some embodiments, the amount can instead be based on the total weight of the composition. The PM can comprise, for example, MAYOQUEST 3000, available from Compass Chemical International, LLC, of Smyrna, Ga.

The composition can comprise an aqueous solution having a pH of about 3.0 to about 13.8. The pH can be adjusted by any means, for example, the pH can be adjusted by addition of potassium hydroxide to the composition. In some embodiments, the composition can comprise a base such as an alkaline hydroxide, an alkaline earth hydroxide, or any combination thereof. The composition can comprise an alkaline hydroxide in an amount of at least 1.0% by weight, for example, in an amount in a range of from about 1.0% by weight to about 25.0% by weight, in a range of from about 2.0% by weight to about 20% by weight, or in a range of from about 4.0% by weight to about 13% by weight, based on the total weight of the composition. The alkaline hydroxide can comprise sodium hydroxide, potassium hydroxide, or any combination thereof.

In some embodiments, the composition can comprise softened water. For example, cation ion-exchange can be employed to form softened water that can be used in the composition. The softened water can be essentially free of cations, for example, substantially free of aluminum, barium, calcium, iron, magnesium, and manganese ions, or can contain metal levels of less than about 0.1% by weight, less than about 0.01% by weight, less than about 0.001% by weight, or less than about 0.0001% by weight based on the total weight of the core components. The softened water can be essentially free of multivalent cations. In some embodiments, the softened water can comprise a hardness level, measured as a calcium carbonate equivalent, of about 10 mg/L or lower. In some embodiments, the hardness level of the softened water can be 5 mg/L or lower, 2 mg/L or lower, 1 mg/L or lower, or 0.5 mg/L or lower.

The composition of the present teachings can also comprise one or more additives. Examples of additives that can be used include sodium tolytriazole, sodium mercaptobenzothiazole, sodium benzotriazole, sodium lauroyl sarcosinate, triphenylmethane, copper phthalocyanine quad sulfonate, tetrasodium 1,3,6,8 pyrene tetrasulfonate, sodium molybdate dehydrate, and combinations thereof. For example, the composition can incorporate, based on the total weight of the core components, sodium tolytriazole at levels of from about 1.0% by weight to about 3.0% by weight, sodium mercaptobenzothiazole at levels of from about 5.0% by weight to about 10.0% by weight, sodium benzotriazole at levels of from about 1.0% by weight to about 4.0% by weight, sodium lauroyl sarcosinate at levels of from about 0.5% by weight to about 2.0% by weight, triphenylmethane at levels of from about 0.2% to about 0.6% by weight, copper phthalocyanide quad sulfonate at levels of from about 0.2% by weight to about 0.8% by weight, tetrasodium 1,3,6,8 pyrene tetrasulfonate at levels of from about 0.1% by weight to about 0.2% by weight, and sodium molybdate dehydrate at levels of from about 1.5% by weight to about 3.0% by weight. All these exemplary levels are particularly useful in a composition containing from about 5.0% by weight to about 8.0% by weight PBCT, for example, 6.7% by weight PBCT, based on the total weight of the core components. The amounts of each of these components can be independently varied, for example, to double the amount mentioned above, half of the amount mentioned above, or to be within the range of from about half to about double of each respective amount mentioned above.

In some embodiments, the formulation of the composition can be adjusted based on the materials used in the cooling system construction. For example, the composition can comprise sodium tolytriazole when yellow metal components are utilized, such as, brass, bronze, copper alloys, and the like. The formulation of the composition can be adjusted so it can be used with, for example, soft steel, zinc, galvanized steel, and the like.

Dosage control of the composition can be achieved, according to various embodiments, by manual or automatic analysis of the cooling water and subsequent manual or automatic addition of the composition. An appropriate analyzer, pump, and control unit can be provided such that a detected value can be sent to the control unit from the analyzer and the control unit can then control the pump based on the signal received. Dosage control can be achieved by measurement of the volume of makeup water added to the cooling tower with subsequent automatic addition of a proportional amount of composition to maintain established control levels, for example, via a chemical pump. Dosage control can be achieved by an automatic product level determination, for example, via methods, products, and processes as disclosed in U.S. patent application Ser. No. 11/700,643, filed Jan. 31, 2007, which is incorporated herein by reference in its entirety.

The present teachings provide a method of preventing mineral scale and deposition within a cooling tower, the cooling tower containing cooling water contained therein, wherein the method comprises adding each of the core components of phosphonobutane tricarboxylic acid (PBCT), a polyacrylic acid species (PAS), polymaleic acid (PM), and softened water, individually, or in any combination of admixtures, so as to maintain a level of PBCT in the treated cooling water of from about 6 mg/L to about 14 mg/L.

In some embodiments, the methods of the present teachings can comprise using a biocide for control of biological growth within a cooling tower and associated system. Any biocide or combination of biocides can be employed, for example, the biocide can comprise bromine. In some embodiments the biocide can comprise electrolytic bromine as the sole biocide, as described, for example, in U.S. patent application Ser. No. 11/807,402, filed May 29, 2007, which is herein incorporated by reference in its entirety. Other biocides that can be utilized with acceptable results include one or more of ozone, chlorine dioxide, chlorine, sodium hypochlorite, various organic biocides, hydrogen peroxide, combinations thereof, and the like.

EXAMPLES

Example 1

In accordance with the present teachings, an exemplary composition for controlling calcium scale and deposition was made having the formulation shown below in Table 1. Unless indicated otherwise, all amounts, percentages, ratios, and the like, described herein, are by weight based on the total weight of the entire composition, not just based on the core components. All of the components active or otherwise are commercially available.

TABLE 1

| Component | CAS Number | Weight % |
|---|---|---|
| soft water | | 36.0 |
| sodium hydroxide | 1310-73-2 | 5.0 |
| phosphonobutane tricarboxylic acid (PBCT) | 37971-36-1 | 6.7 |
| polyacrylic acid (PA) | 9003-01-4 | 5.0 |
| polymaleic acid (PM) | 26099-09-2 | 15.0 |
| triphenylmethane | 3844-45-9 | 0.286 |

The balance to make up 100% by weight was water from the non-soft water components being supplied as aqueous solutions. The final formulation had a pH of from 3.2 to 3.6.

Examples 2 and 3

More specific exemplary compositions for controlling corrosion and deposition were made having the formulations shown below in Table 2 (Example 2) and in Table 3 (Example 3).

TABLE 2

| Component | CAS Number | Weight % |
|---|---|---|
| soft water | | 34.2 |
| potassium hydroxide | 1310-58-3 | 2.75 |
| phosphonobutane tricarboxylic acid (PBCT) | 37971-36-1 | 6.7 |
| polyacrylic acid styrene sulfonate (AASA) | 97953-25-8 | 5.0 |
| polymaleic acid (PM) | 26099-09-2 | 15.0 |
| sodium tolytriazole | 6466-55-72 | 1.5 |
| copper phthalocyanide quad sulfonate | | 0.425 |

The balance to make up 100% by weight was water from the non-soft water components being supplied as aqueous solutions. The final formulation had a pH of from 2.5 to 3.0.

TABLE 3

| Component | CAS Number | Weight % |
|---|---|---|
| soft water | | 24.6 |
| sodium hydroxide | 1310-73-2 | 11.9 |
| phosphonobutane tricarboxylic acid (PBCT) | 37971-36-1 | 4.5 |
| polyacrylic acid (PA) | 9003-01-4 | 3.3 |
| polymaleic acid (PM) | 26099-09-2 | 10.0 |
| sodium mercaptobenzothiazole | 2492-26-4 | 6.7 |
| copper phthalocyanide quad sulfonate | | 0.289 |

The balance to make up 100% by weight was water from the non-soft waer components being supplied as aqueous solutions. The final formulation had a pH of from 13.2 to 13.7.

Common to the formulations shown in Tables 1-3 is the presence of PBCT, PAS, and PM in a ratio of about 1:0.75: 2.25. The operating COC that can be obtained by such a composition when maintained at a level of 6 to 14 mg/l as PBCT in the treated cooling water can be readily calculated by the formula:

$$\text{operating COC} = 2 + \sqrt{110{,}000/(\text{CaH} + \text{TA})}$$

wherein CaH is the calcium hardness of the makeup water as $CaCO_3$ in mg/L; and TA is the total alkalinity to pH 4.5 of the makeup water as $CaCO_3$ in mg/L.

All publications, patents, and patent applications mentioned in this specification are herein incorporated by reference to the same extent as if each individual publication, patent, or patent application was specifically and individually indicated to being incorporated by reference.

While embodiments of the present disclosure have been shown and described herein, it is to be understood that such embodiments are provided by way of example only. Numerous variations, changes, and substitutions will now occur to those skilled in the art without departing from the present disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A method of preventing mineral scale and deposition within a cooling tower, the cooling tower containing cooling water contained therein, the method comprising:
adding to the cooling water each of phosphonobutane tricarboxylic acid (PBCT), a polyacrylic acid species (PAS), polymaleic acid (PM), and softened water, individually, or in a combination of admixtures, so as to form treated cooling water, the weight % ratio of PBCT to PM being from about 1:1.5 to about 1:3 and the weight % ratio of PAS to PM being from about 1:2 to about 1:4; and
maintaining a level of PBCT in the treated cooling water of from about 6 mg/L to about 14 mg/L;
determining a calcium hardness of a makeup water as $CaCO_3$ in mg/L;
determining a total alkalinity of the makeup water as $CaCO_3$ in mg/L;
calculating an operating cycles of concentration (COC) for operation of the cooling tower according to the equation:

$$\text{operating COC} = 2 + \sqrt{110{,}000/(\text{CaH} + \text{TA})}$$

wherein: CaH is the calcium hardness of the makeup water as $CaCO_3$ in mg/L, and TA is the total alkalinity of the makeup water as $CaCO_3$ in mg/L;
operating the cooling tower at the calculated operating COC; and
adding the makeup water to the cooling water to maintain the operating COC.

2. The method of claim 1, wherein:
the adding to the cooling water comprises adding together as an aqueous solution the phosphonobutane tricarboxylic acid (PBCT), the polyacrylic acid species (PAS), the polymaleic acid (PM), and the softened water; and
the aqueous solution has a pH of from about 2.0 to about 13.7.

3. The method of claim 1, wherein the PBCT, PAS, and PM are present in a weight % ratio of 1:0.75:2.25, respectively.

4. The method of claim 1, further comprising adding a biocide to the cooling water or to the treated cooling water.

5. The method of claim 4, wherein the biocide comprises bromine.

6. A method of preventing mineral scale and deposition within a cooling tower, the cooling tower containing cooling water contained therein, the method comprising:

adding to the cooling water each of phosphonobutane tricarboxylic acid (PBCT), a polyacrylic acid species (PAS), polymaleic acid (PM), and softened water, individually, or in a combination of admixtures, so as to form treated cooling water, the weight % ratio of PBCT to PM being from about 1:1.5 to about 1:3 and the weight % ratio of PAS to PM being from about 1:2 to about 1:4; and maintaining a level of PBCT in the treated cooling water of from about 6 mg/L to about 14 mg/L, wherein the adding comprises adding together as an aqueous solution the PBCT, the PAS, the PM, and the softened water, the aqueous solution has a pH of from about 2.0 to about 13.7, and the aqueous solution consists of the PBCT, the PAS, the PM, and the softened water.

* * * * *